United States Patent [19]

F'Geppert

[11] 3,938,815
[45] Feb. 17, 1976

[54] CHUCK HAVING JAW COUNTERBALANCE MECHANISM

[75] Inventor: Erwin F'Geppert, Novi, Mich.

[73] Assignee: The United States of America as represented by the Secretary of the Army, Washington, D.C.

[22] Filed: Mar. 31, 1975

[21] Appl. No.: 563,545

[52] U.S. Cl.................. 279/1 C; 279/110; 279/123
[51] Int. Cl.²................... B23B 31/14; B23B 31/24
[58] Field of Search ......... 279/1 C, 66, 67, 68, 110, 279/112, 123

[56] References Cited
UNITED STATES PATENTS

| | | | |
|---|---|---|---|
| 2,757,010 | 7/1956 | Sloan et al. | 279/112 |
| 2,828,134 | 3/1958 | Buck et al. | 279/1 C |

*Primary Examiner*—Travis S. McGehee
*Attorney, Agent, or Firm*—John E. McRae; Peter A. Taucher; Robert P. Gibson

[57] ABSTRACT

A chuck or coupling for connecting a rotary shaft to variable diameter work pieces; the work piece can be a pulley, shaft, bar stock or other mechanism required to be gripped by a chuck. The chuck structure comprises radially movable jaws slidably mounted on a rotary base or chuck body, together with a counterbalance for each jaw. Each counterbalance is located on a diametrical line passing through the associated jaw, whereby the jaw and counterbalance are subjected to oppositely directed radial forces during high speed rotation of the chuck structure. Centrifugal force is utilized to increase the gripping force of each jaw on the work piece.

9 Claims, 4 Drawing Figures

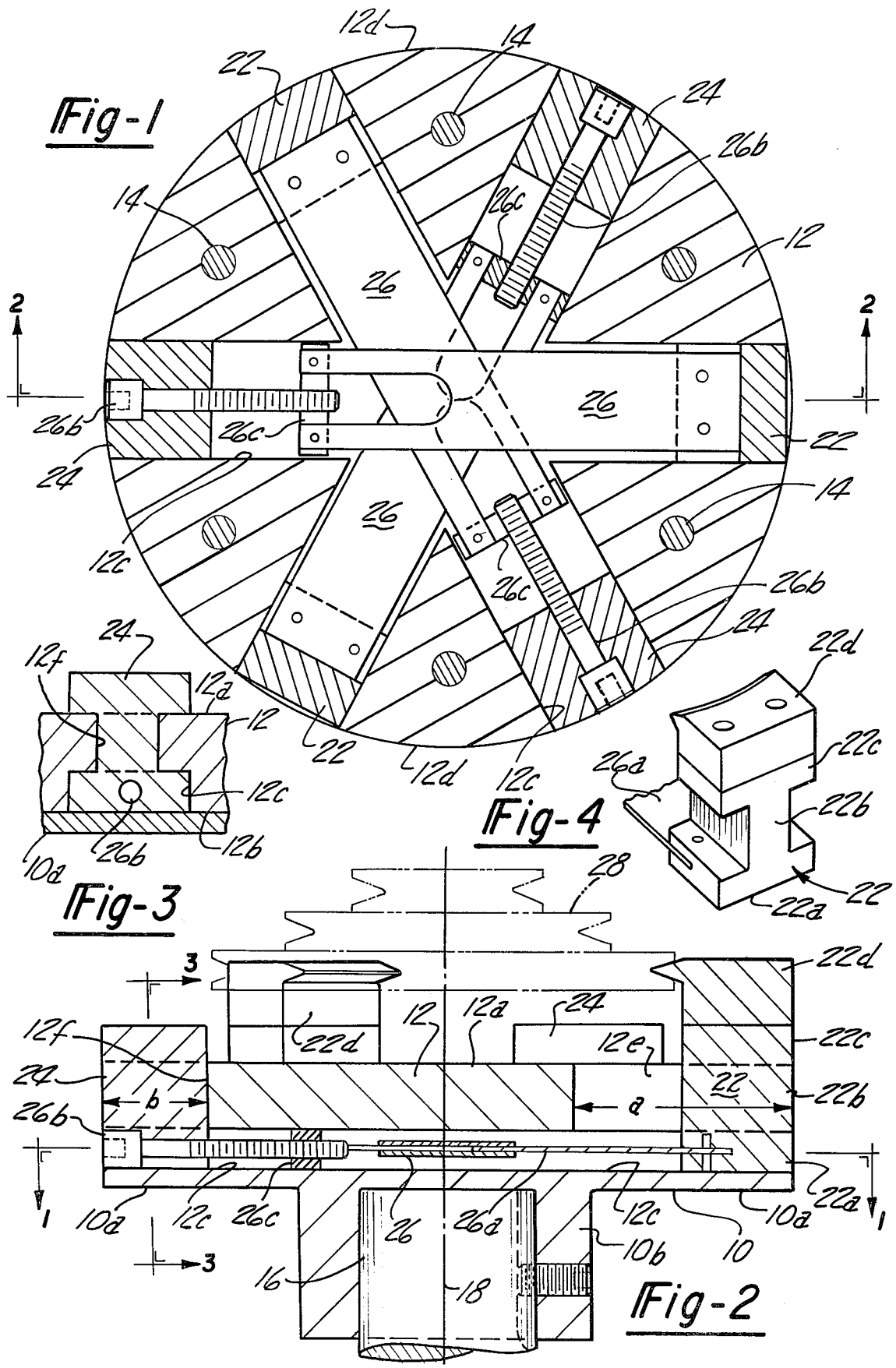

CHUCK HAVING JAW COUNTERBALANCE MECHANISM

The invention described herein may be manufactured, used and licensed by or for the Government for governmental purposes without payment to me of any royalty thereon.

SUMMARY OF THE INVENTION

High speed rotary equipment such as a lathe, or an electric generator, or an electric motor, or a centrifugal compressor impeller, is sometimes required to be connected to varying diameter work pieces or drive elements. The "variable diameter" nature of the work piece or drive element poses a "connection" problem.

The present invention provides a high speed coupling or chuck structure comprising radially movable jaws adjustable for gripping work pieces of varying diameter. The chuck structure is designed so that high centrifugal forces associated with high rotational speeds are suitably controlled to increase the gripping forces of the jaws on the work pieces. The chuck structure is thus adapted for use at higher speeds than other chuck structures not having this controlled-force feature.

THE DRAWINGS

FIG. 1 is a sectional view taken on line 1—1 in FIG. 2 through a chuck structure incorporating the invention.

FIG. 2 is a sectional view taken on line 2—2 in FIG. 1.

FIG. 3 is a fragmentary sectional view taken on line 3—3 in FIG. 2.

FIG. 4 is a perspective view of a jaw element used in the FIG. 1 chuck structure.

The chuck structure shown in the drawings comprises a two piece base comprised of members 10 and 12 bolted together by six bolts 14 equi-spaced around the periphery of the defined base. Member 10 includes a flat plate-like disc portion 10a and a tubular hub portion 10b suitably configured for connection to a shaft 16. Shaft 16 may be a powered shaft, in which case it acts as the input drive member for the chuck structure. Alternately shaft 16 can be the output driven member. In either event the shaft and chuck structure are arranged for rotation around a central axis 18.

Base member 12 comprises a circular block having an upper exposed face 12a and a lower face 12b engaged with the upper face of the aforementioned disc portion 10a. Lower face 12b is formed with three rectangular slideways 12c extending diammetrically from one point on the block peripheral surface 12d to another point on the block peripheral surface. Each slideway 12 communicates with two slots 12e and 12f extending radially inward from peripheral edge 12d toward central axis 18. Each slot 12e has a relatively long radial dimension a; each slot 12f has a relatively short radial dimension b. Slot dimension a is selected to permit the associated jaw 22 to slide radially inward toward central axis 18. Slot dimension b is selected to prevent the associated counterbalance 24 from inward sliding movement.

As seen in FIG. 1, there are three jaws 22 and three counterbalances 24. Each counterbalance is connected to the associated jaw by a tensioned connector means 26 that extends diammetrically across the intervening space between the jaw and counterbalance. By suitable adjustments of the three connector means 26 it is possible to move the three jaws radially toward the central axis 18, thereby causing said jaws to grip the circumscribed work piece 28. As seen in FIG. 2, the work piece takes the form of a pulley having three sections of differing diameter. When the pulley is oriented so that the large diameter section is gripped by jaws 22, the small diameter portion of the pulley is exposed for operative connection to a non-illustrated drive belt; the belt may drive the chuck structure or the chuck structure may drive the belt, depending on the installation requirement. When the pulley is oriented with its small diameter section gripped within the jaws 22 the large diameter section of the pulley is exposed for operative connection with the belt. The work piece 28 can of course be some device other than a pulley, e.g. a shaft or length of bar stock.

As seen in FIG. 4, jaw 22 is of I cross-section, comprising a lower shoe portion 22a, an intermediate neck portion 22b, and an upper shoe portion 22c; a workgripper element 22d is suitably secured to shoe portion 22c, as by screws, welding, rivets, etc. Each jaw is slidably accommodated in base member 12 so that its shoe portion 22a fits within slideway 12c, and its neck portion 22b fits within slot 12e.

Each counterbalance 24 has essentially the same shape and dimensions as the jaw 22; however the counterbalance has no work gripper element corresponding to element 22d. As seen in FIG. 2, the counterbalance slidably fits within member 12 so that it can shift from its illustrated position radially outward (away from axis 18). In the static at-rest condition counterbalance 24 abuts surface 25 defined by the associated slot 12f in member 12.

Each of the aforementioned connector means 26 comprises a flat metal band 26a suitably connected to jaw 22 and a bolt 26b freely extending through the counterbalance 24 to a threaded connection with a nut 26c that is suitably secured to the metal band. The nut cross-section corresponds to the dimension of slideway 12c; accordingly the nut is slidably keyed for movement toward or away from the chuck structure axis 18 while being restrained against rotation around the nut axis.

It will be seen that suitable manual rotation of bolt 26b (by a socket wrench not shown) produces a translational movement of nut 26c along slideway 12c. Band 26a is sufficiently stiff to transmit such movement to the associated jaw 22. By selective turning of the three bolts 26b it is possible to tighten the three jaws 22 on the work piece 28. Slot dimension a enables each jaw to accommodate itself to different diameter work pieces.

During high speed rotation of the chuck structure the centrifugal force tends to throw each jaw 22 radially outward away from central axis 18. However, at the same time the centrifugal force exerts a similar outward bias on each counterbalance 24 (but in an opposite direction). Assuming each counterbalance has the same mass and radial spacing from axis 18 as the associated jaw 22, the outward biasing forces generated in members 22 and 24 during high speed rotation of the chuck will be cancelled; therefore the centrifugal force will have no tendency to loosen the grip of each jaw 22 on the work piece. If each counterbalance 24 is constructed of a heavier material (or is longer in the radial direction) than each jaw 22 then the jaws will in fact tend to more tightly grip the work piece as the rotational speed is increased. The mass of each counterbalance can be selected according as it is desired to achieve partial counterbalancing, full counterbalancing, or over counterbalancing.

It is contemplated that during rotation of the chuck each counterbalance 24 will maintain its position substantially engaged with surface 12f. The clamped work piece 28 will exert a reaction force on jaw 22 that is transmitted through connector means 26 to the associated counterbalance. Therefore even though each counterbalance is made to have a greater effective mass than the diammetrically opposed jaw 22, there will be no substantial outward displacement of the counterbalance except for the minor displacement permitted by the stress-strain character of connector means 26.

The central areas of the flat metal bands 26a lie flatwise against one another so that the bands exert mutual frictional forces tending to resist outward deflection of the jaws or counterbalances. The metal bands are slightly bent or deformed because their anchorage points (at shoe portion 22a and nut 26c) are in the same radial plane. Centrifugal forces tend to produce an increase in the frictional pressure of one band on another, thus further adding to the stabilizing action achieved by the use of counterbalances 24.

The jaws 22, counterbalances 24 and connector devices 26 are initially installed prior to the operation of bolting members 10 and 12 together. Maintenance on the components involves a reverse series of operations.

I wish it to be understood that I do not desire to be limited to the exact details of construction shown and described for obvious modifications will occur to a person skilled in the art.

I claim:

1. A chuck structure comprising a base adapted to be rotated around a central axis; work gripper jaws slidably mounted on said base for radial adjustments toward and away from said central axis; a counterbalance for each jaw; each counterbalance being slidably mounted on the base for movement along a diammetrical line passing through the associated jaw and the central axis; and tensioned connector means joining each jaw with its counterbalance.

2. The chuck structure of claim 1: each tensioned connector means comprising a first threaded member carried by the respective jaw, and a second cooperating threaded member carried by the respective counterbalance; said threaded members being rotatably interengaged to draw the jaw and counterbalance toward each other.

3. The chuck structure of claim 1: said base including an abutment surface for limiting slidable movement of each counterbalance toward the central axis, whereby in the static at-rest position each counterbalance functions as a fixed anchorage point for the associated connector means.

4. The chuck structure of claim 3: each abutment surface being spaced the same distance from the chuck structure axis, whereby each counterbalance exerts the same radial force on the associated connector means.

5. The chuck structure of claim 1: each connector means comprising a flat metal band extending across the chuck structure axis; said metal bands lying flatwise against one another to exert mutual frictional effects thereon.

6. The chuck structure of claim 1: each connector means comprising a flat metal band carried by the associated jaw, and a threaded bolt extending through the counterbalance to a threaded connection with a nut secured to the metal band.

7. The chuck structure of claim 6: each nut being slidably keyed to the base, whereby each nut can be adjusted radially toward or away from the chuck structure axis while being restrained against rotation around the nut axis.

8. The chuck structure of claim 1: each counterbalance having substantially the same mass as its associated jaw.

9. The chuck structure of claim 8: each jaw and its counterbalance comprising similarly shaped block elements having shoe sections slidably keyed in a diammetrically extending slideway formed in the base; each tensioned connector means being trained between the shoe sections of the associated jaw and counterbalance in the vacant area defined by the slideway.

* * * * *